(12) United States Patent
Tada et al.

(10) Patent No.: US 6,758,937 B2
(45) Date of Patent: Jul. 6, 2004

(54) METHOD FOR MOUNTING SHOCK ABSORBING MATERIAL

(75) Inventors: Shin Tada, Kanagawa (JP); Keiichiro Tabata, Kanagawa (JP); Toshiyuki Horimatsu, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 29 days.

(21) Appl. No.: 10/013,648

(22) Filed: Dec. 13, 2001

(65) Prior Publication Data

US 2002/0064627 A1 May 30, 2002

Related U.S. Application Data

(62) Division of application No. 09/337,323, filed on Jun. 21, 1999, now Pat. No. 6,342,288.

(30) Foreign Application Priority Data

Jun. 24, 1998 (JP) .......................................... H10-177451
Sep. 8, 1998 (JP) .......................................... H10-253947

(51) Int. Cl.$^7$ ............................................. B32B 31/00
(52) U.S. Cl. ....................................... 156/297; 156/338
(58) Field of Search .......................... 428/317.1, 317.3, 428/317.5, 317.7, 318.4; 156/297, 325, 326, 327, 338; 296/189

(56) References Cited

U.S. PATENT DOCUMENTS 4,364,972 A 12/1982 Moon
5,254,402 A * 10/1993 Okubo et al. ............ 428/317.7
5,318,835 A * 6/1994 Sawamoto et al. ...... 428/317.7

FOREIGN PATENT DOCUMENTS

EP 95/06691 3/1995

* cited by examiner

*Primary Examiner*—Donald J. Loney
(74) *Attorney, Agent, or Firm*—Kanesaka & Takeuchi

(57) ABSTRACT

A shock absorbing material for automobiles, having extremely good shock absorbing properties, capable of absorbing shocks applied to a passenger in a car at the time of a crash, or the like, and reducing the head injury criteria, comprising a rigid polyurethane foam having a compression stress of 3 kg/cm$^2$ or more, with concavities arranged on at least one planar surface. In order to mount the head protecting material to a ceiling material, a trim, a car body, or the like, easily and securely, the head protecting material is mounted to the ceiling material, or the like, with an adhesive sheet comprising a base material made of a foam material with an adhesive layer formed thereon.

7 Claims, 8 Drawing Sheets

Fig. 11
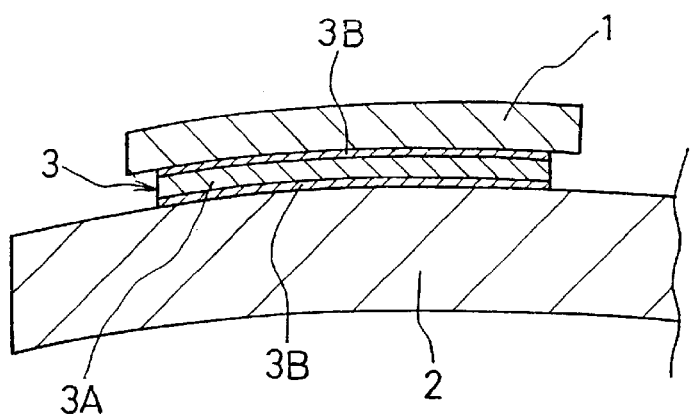
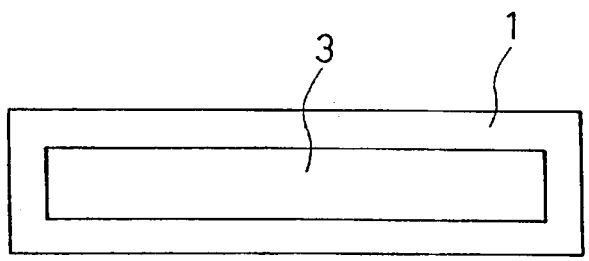
Fig. 12a
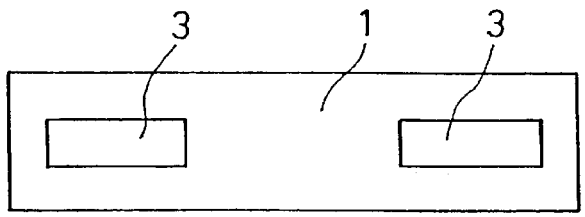
Fig. 12b
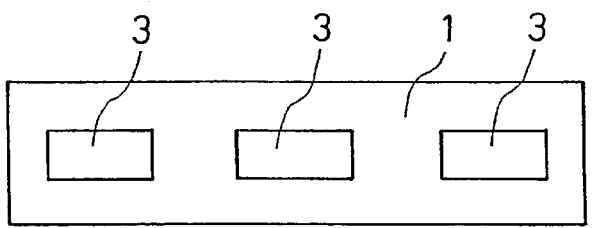
Fig. 12c
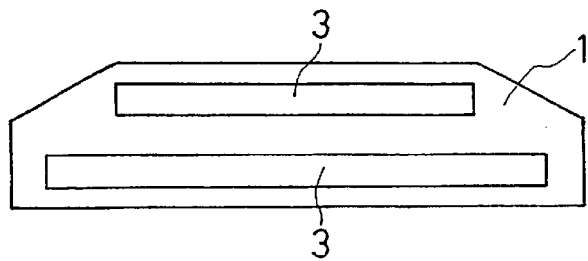
Fig. 12d

METHOD FOR MOUNTING SHOCK ABSORBING MATERIAL

CROSS REFERENCE TO RELATED APPLICATION

This is a divisional patent application from U.S. patent application Ser. No. 09/337,323 filed on Jun. 21, 1999 now U.S. Pat. No. 6,342,288.

BACKGROUND OF THE INVENTION AND RELATED ART STATEMENT

The present invention relates to a shock absorbing material, and in particular relates to a shock absorbing material for automobiles, suitable for reducing head injury criteria by absorbing shock energy imparted to the heads of passengers in the car interior at the time of a crash.

The present invention also relates to a method for easily and securely mounting a protecting material to the car body, the ceiling material, the trim, or the like for improving safety by absorbing and reducing shock energy imparted to the heads or other body parts of passengers in the car interior at the time of a crash.

As shock absorbing materials for automobiles, the following have been proposed conventionally:

i) Japanese Unexamined Utility Model Publication No. 6-42437 discloses one comprising a pillar guard of a resin with a hollow shape, with a rigid polyurethane foam provided in a hollow part thereof for absorbing shock.

ii) Japanese Unexamined Patent Publication No. 8-2358 discloses a pad material comprising a foam material or a rubber material.

iii) Japanese Unexamined Patent Publication No. 8-72642 discloses one comprising a cushion member made from a rigid polyurethane foam covered with a shape-protecting material made of a sheet metal with a concave portion formed therein.

iv) Japanese Unexamined Patent Publication No. 6-211088 discloses a shock absorbing material mounted with a trim.

v) Japanese Unexamined Patent Publication No. 7-16867 discloses a shock absorbing material comprising a bead-like molded resin, with a large number of upright ribs provided on one side surface as shown in FIG. 9 described later.

vi) Japanese Unexamined Patent Publications Nos. 8-142234 and 8-295194 disclose a shock absorbing material made from a polyolefin resin material, with upright lattice-like ribs provided.

The above-mentioned conventional shock absorbing materials have the following disadvantages.

That disclosed in Japanese Unexamined Utility Model Publication No. 6-42437 uses a rigid polyurethane foam as the protecting material for shocks to the head; however, since it has a composite structure with a hollow-shaped resin part (trim), the compression stress of the rigid polyurethane foam must be as low as 0.2 to 2 kg/cm$^2$, and thus the optimum structure utilizing the characteristics of the polyurethane foam cannot be provided. Moreover, since the irregular shape is for reducing the weight and maintaining strength thereof, but is not for improving the shock absorbing ability, the shock absorbing ability cannot be improved.

Japanese Unexamined Patent Publication No. 8-2358 describes an example of the conventional technique of a pad shock absorbing material comprising a foam material or a rubber material. This example mentions that the pad is elastically deformed, and thus it is not a rigid polyurethane foam. Moreover, regarding the concave shape, since the part contacting the car body is extremely thin, the pad must be thick in order to yield sufficient shock absorbing ability, and thus problems arise in that due to reduced car interior space in the automobile, comfort, convenience in entering and exiting, and visibility range are degraded.

That disclosed in Japanese Unexamined Patent Publication No. 8-72642 has an overall concave shock absorbing structure. However, the soft or rigid polyurethane foam itself used as the cushion material does not have an irregular shape to improve performance, but has a concave shape only at the mounting part. Moreover, it is mentioned that a sufficient shock absorbing ability cannot be achieved with an overall excessively high or low rigidity, but a specific numerical value or range is not described, and thus it is difficult to ensure that good shock absorbing ability can be obtained.

Since that disclosed in Japanese Unexamined Patent Publication No. 6-211088 is fastened onto a car body with trim by a clip, trim is necessary for mounting the shock absorbing material. Therefore, use thereof as a head protecting material is limited. For example, it is not suitable for side rails, or the like. Furthermore, the shock absorbing material does not have an irregular shape. Moreover, it is mentioned that it has a thickness necessary for absorbing shock, but specific thicknesses or hardnesses are not described, and thus it is difficult to ensure that good shock absorbing ability can be obtained.

If a force is applied to a face contact part locally, particularly by a spherical object such as the head of a dummy, the force is concentrated in the beam part between ribs, as disclosed in Japanese Unexamined Patent Publication No. 7-16867, comprising a bead-like molded resin, and thus sufficient shock absorbing ability cannot be obtained. If the shaped part is made of a rigid polyurethane foam, the beam part will break. As a result, a distance effective for absorbing energy cannot be obtained.

Those disclosed in Japanese Unexamined Patent Publication Nos. 8-142234 and 8-295194 have a thin lattice-like rib of 0.6 to 1.2 mm, and furthermore, it is disadvantageous in that because a polyolefin resin rib absorbs energy basically by the bending of the rib, shock absorbing ability is highly dependent on the direction of the shock.

As mentioned above, none of the conventional shock absorbing materials obtaining optimum shock absorbing ability by actively designing the shape of the shock absorbing material. As a result, it has never been possible to provide a high shock absorbing ability by the shock absorbing material itself.

On the other hand, since the thicknesses of pillars and side rail portions in an automobile greatly influences the comfort, styling, and security of the range of view in terms of safety, in order to protect passengers by reducing head injury criteria of the passengers without hindering these factors, a shock absorbing material capable of realizing sufficient shock absorbing ability, and which is a thin shock absorbing material, is needed.

These days, in order to improve automobile safety, head protecting material for damping shocks to the head of a passenger has been mounted to a car body inner wall, a ceiling material, a trim, or the like.

The head protecting material, in general, is a strip-like member about 60 mm×450 mm×20 mm. Conventionally, those comprising a rigid polyurethane foam, those comprising a bead-like foamed member of a polypropylene, polyethylene or polyolefin resin, resin ribs of an ABS, polypropylene, polyethylene, polyolefin, or the like, have been provided. These head protecting materials are made of a material with a relatively high hardness.

In mounting such a head protecting material to, for example, the rear surface of a ceiling material of an automobile, it is mounted along the sides of the ceiling material 10 corresponding to the seat position of passengers as shown in FIG. 13A as 11A, 11B, 11C, 11D. As shown in FIG. 13B (enlarged view of the cross-section taken on the line XIIIB—XIIIB of FIG. 13A), an adhesive tape 12 or an adhesive is used for mounting.

Conventionally, as the adhesive tape 12, one comprising a base material of non-woven fabric, paper, plastic film, or the like, and an adhesive material applied thereon for forming an adhesive layer has been used. Moreover, as the adhesive, a hot melt adhesive, a solvent adhesive, or an aqueous adhesive has been used.

The conventional head protecting material mounting method involves the following problems.

Although the mounting operation itself can be easier by mounting with an adhesive tape compared with the case of using an adhesive, since the head protecting material is made of a relatively hard material and thus cannot follow the deformation of the mounted surface, the head protecting material can easily peel and fall off. That is, if the head protecting material is mounted to a part of a flat and wide area like the rear surface of the ceiling material, when the part is deformed by twisting during transportation, the adhesive surface peels and falls off due to inability to conform to the deformations of the hard the head protecting material. Moreover, in assembling a part mounted with the head protecting material, such as the ceiling material with a car body, since the head protecting material projects from the part, such as the ceiling material for the thickness thereof as a level difference, the projecting head protecting material contacts the car body, or the like, the head protecting material falls off from the part also in this case due to inability of the adhesive surface to follow the deformation for the hardness of the head protecting material.

On the other hand, in the case of mounting with an adhesive, since the part needs to be left for about one day after application of an adhesive in a method of using an aqueous adhesive, a long mounting operation time is required, and thus it is not practical.

Moreover, since the head protecting material needs to be fixed and held for 20 to 30 seconds after application when a hot melt adhesive is used, and an standing time is required after application of an adhesive in the case of a solvent adhesive, both require a large number of bonding steps, and thus are difficult to execute. Moreover, since both the hot melt adhesive and the solvent adhesive become adhesive by hardening and the adhered to surface becomes hard, the adhered to surface cannot conform to the deformation when there is deformation during transportation or a crash of the car body so that a problem arises in which the head protecting material falls off, as in the case of the adhesive tape.

OBJECT AND SUMMARY OF THE INVENTION

Accordingly, a first object of the present invention is to provide a shock absorbing material for an automobile having extremely good shock absorbing ability and which is suitable for absorbing shock energy from a pillar impacting a head of a passenger including a driver in a cabin at the time of a crash of an automobile, or the like, and reducing head injury criteria.

A shock absorbing material according to the present invention consists of a rigid polyurethane foam having a 3 kg/cm$^2$ or more compression stress, and has a shape of a board with concave parts arranged on at least one planar surface thereof.

In the shock absorbing material according to the present invention, stable shock absorbing ability can be achieved by absorbing shock energy by crushing of at least one wall part between the adjacent concave portions in the shock absorbing material, and by the crushed wall(s) entering into the concave portions successively. Furthermore, owing to the entrance of the crushed wall into the concave portions, a large stroke can be obtained, and thus the shock value to be applied to the passengers can be reduced sufficiently.

In the present invention, it is preferable that the ratio of the volume of the concave portions with respect to the total of the volume of the rigid polyurethane foam part and the volume of the concave portions (hereinafter the ratio may be referred to as the "excavated ratio") be 10 to 40%.

Moreover, it is preferable that the concave portions are arranged parallel in one direction, with an arrangement pitch of 30 mm or less, and that the width of the wall between the adjacent concave portions has a thickness of 2 to 15 mm.

The shock absorbing material of the present invention may be mounted to an automobile body or an interior part such as a head liner, a trim, or the like thereof as a protecting material against shocks to a head of a person in a cabin of the automobile.

A second object of the present invention is to provide a method for mounting a protecting material to a ceiling material, a trim, an automobile body, or the like easily and securely.

In a method for mounting a protecting material by attaching the protecting material in an automobile with an adhesive sheet according to the present invention, the adhesive sheet comprises a base material made of a foam material and an adhesive layer formed thereon.

With the adhesive sheet having a foam material as the base material, peeling off or falling off of the protecting material can be prevented due to deformation of the foam material provided as the base material.

In the present invention, it is preferable that the density of the foam material comprising the base material of the adhesive sheet is 0.005 to 0.5 g/cm$^3$, and the base material thickness is 0.5 to 5 mm.

BRIEF DESCRIPTION OF THE DRAWINGS

FIG. 11 is a cross-sectional view showing an embodiment of a method for mounting a protecting material according to the present invention;

FIGS. 12A to 12D are plan views showing embodiments of attaching an adhesive tape.

DESCRIPTION OF PREFERRED EMBODIMENTS

Hereinafter embodiments of the present invention will be explained in detail with reference to the drawings.

Figure 1:
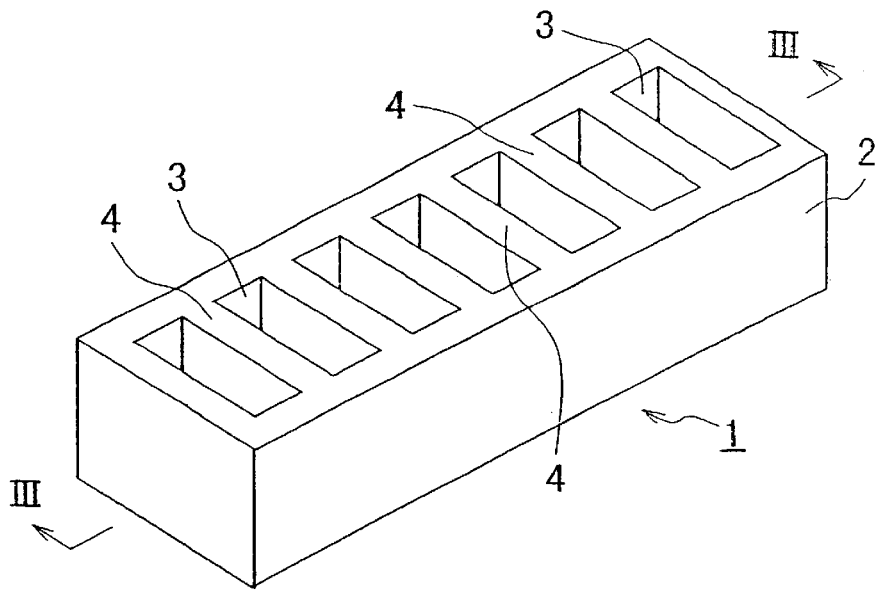
FIG. 1 is a perspective view showing an embodiment of a shock absorbing material according to the present invention.
Figure 2:
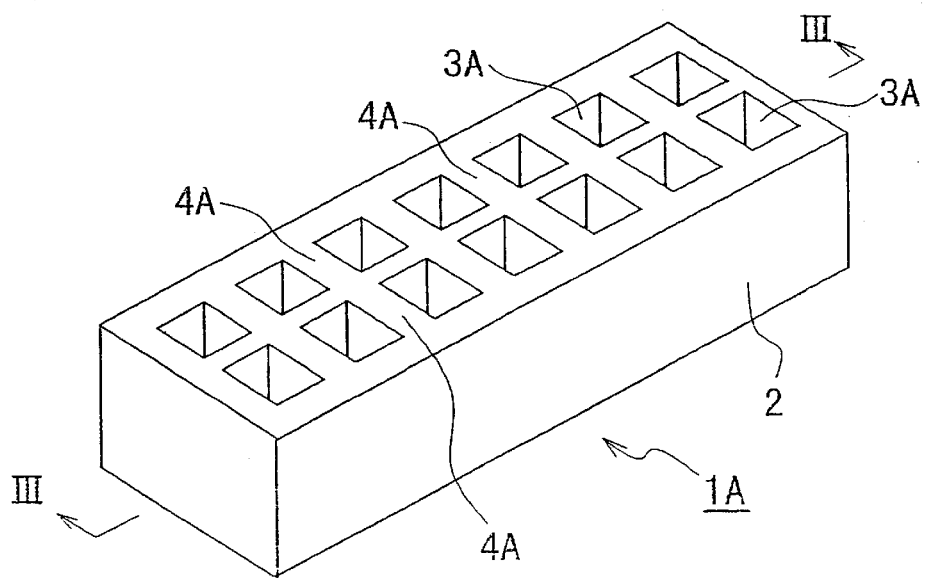
FIG. 2 is a perspective view showing another embodiment of a shock absorbing material according to the present invention.
Figure 3:
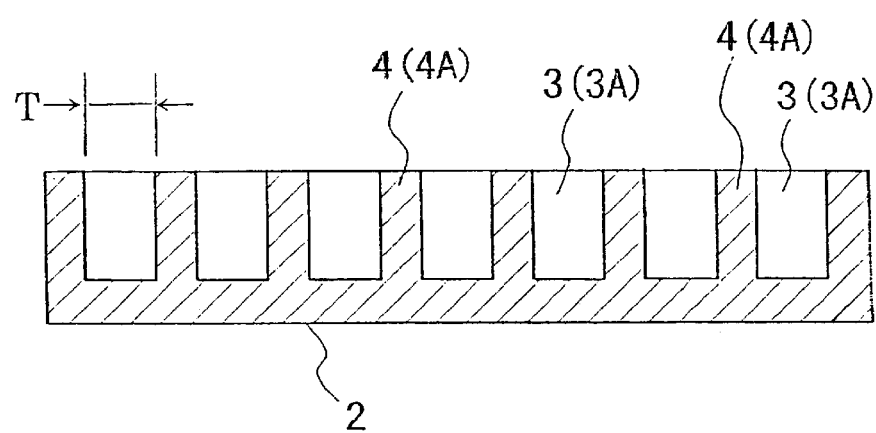
FIG. 3 is a cross-sectional view taken on the line III—III of FIG. 2.

FIGS. 1 and 2 are cross-sectional views showing embodiments of a shock absorbing material according to the present invention, and FIG. 3 is a cross-sectional view taken along the line III—III in FIGS. 1 and 2.

A shock absorbing material 1 shown in FIG. 1 comprises a planar member 2 made of a rigid polyurethane foam, with one planar surface provided with concave portions 3 with a rectangular planar shape, arranged parallel in the longitudinal direction of the planar member 2. The material 1 absorbs shock energy applied thereto by crushing of at least one wall part 4 between the adjacent concave parts 3 and 3, and by the crushed wall entering into the concave portion 3, so that good shock absorbing ability can be obtained.

A shock absorbing material 1A shown in FIG. 2 is provided with concave portions 3A with a substantially square planar shape arranged parallel in two rows in the longitudinal direction of a planar member 2A. Also shock absorbing material 1A, owing to crushing of a wall part 4A between the adjacent concave portions 3A and 3A by shock and entrance of the destroyed portion into the concave portions 3A, good shock absorbing ability can be obtained.

In the present invention, the material for absorbing shock is made of a rigid polyurethane foam having a compression stress of 3 $kg/cm^2$ or more. If the rigid polyurethane foam has a compression stress less than 3 $kg/cm^2$ (29.4 $N/cm^2$), the strength of the wall part between the adjacent concave portions is insufficient so that sufficient shock absorbing ability cannot be obtained by the crush of the wall part in the initial stage of application of a shock. The compression of the rigid polyurethane foam is preferably from about 3 to 40 $kg/cm^2$ (29.4 $N/cm^2$ to 392 $N/cm^2$).

Further, with the above-mentioned excavated ratio of more than 40%, shock absorbing ability in the initial stage is insufficient. Less than 10% of the ratio of the concave parts is too low so that the space for accommodating the destroyed portion is not large enough when the wall part is crushed so that a sufficient stroke cannot be obtained, and the shock absorbing ability in the middle to late stages of the application of a shock is not satisfactory. Therefore, the excavated ratio is defined to be 10 to 40%, and is preferably 15 to 35%.

Moreover, since the shock absorbing ability may differ according to the portion of the planar surface of the shock absorbing material with the concave portions formed thereon with a pitch arrangement of more than 30 mm of the concave parts (distance between the central axes of the adjacent concave portions in plane view), it is preferable that the arrangement pitch of the concave portions is 30 mm or less. However, since it is difficult for the width of the wall part described later to be satisfactory and for the above-mentioned excavated ratio to be satisfactory if the arrangement pitch is extremely small, the arrangement pitch is preferably 10 mm or more.

Furthermore, since the strength of the wall part is insufficient if the thickness of the wall part between the adjacent concave parts is less than 2 mm, the shock absorbing ability in the initial stage is insufficient as mentioned above. On the other hand, since the wall part is too thick with respect to the arrangement pitch of the concave parts of more than 15 mm so that the draft ratio is relatively low, the shock absorbing ability in the middle to later stages is not satisfactory, as mentioned above. Therefore, the thickness of the wall part is preferably 2 to 15 mm, and is more preferably 5 to 10 mm.

The depth of the concave portions can be determined optionally according to the arrangement pitch, the thickness of the wall part, or the like within the range capable of obtaining the above-mentioned excavation ratio, but in general, it is preferable that the depth of the concave portions is about 1/3 to 3/4 of the total thickness of the shock absorbing material.

Figure 4A:
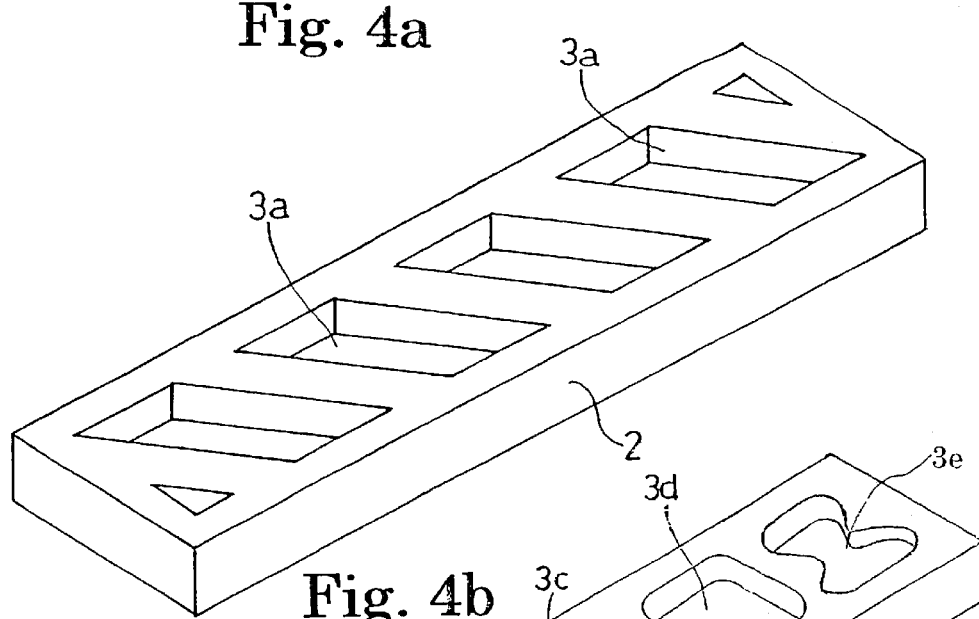
FIGS. 4A to 4C are perspective views showing other embodiments of a shock absorbing material according to the present invention.
Figure 4B:
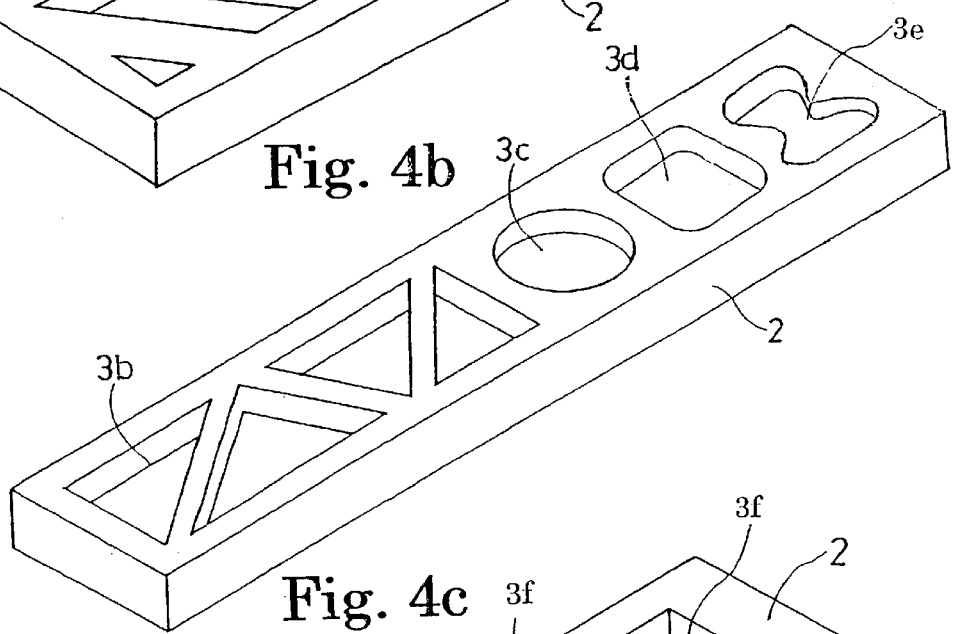
Figure 4C:
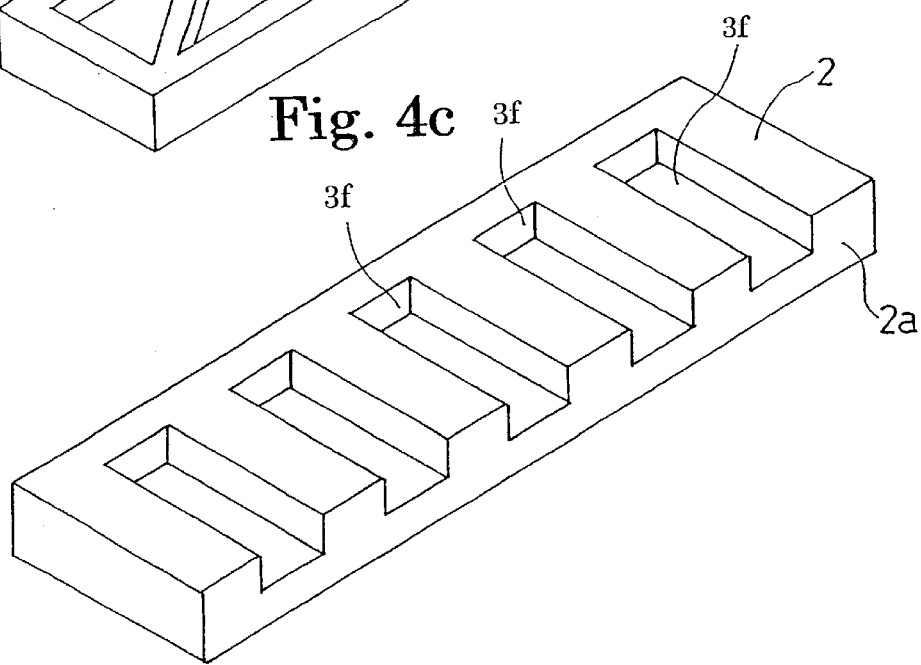

In the present invention, the shape of the concave portions is not particularly limited. For example, the planar shape can be, in addition to a rectangular shape as shown in FIG. 1 and a square shape as shown in FIG. 2, the concave portions 3A can be a parallelogram as shown in FIG. 4A, or an irregular quadrilateral, such as a trapezoid, or the like. Moreover, any other shape, such as a triangle, a circle, an ellipse, a gourd shape, and the like may be used. As shown in FIG. 4B, an optional combination of concave portion with different shapes including a triangular concave portion 3B, a circular concave portion 3C, an elliptical concave portion 3D, and a gourd-shaped concave portion 3E can be used as well. Furthermore, as shown in FIG. 4C, one end of the concave portion 3F can reach one side surface 2A of the planar member 2.

Figure 5:
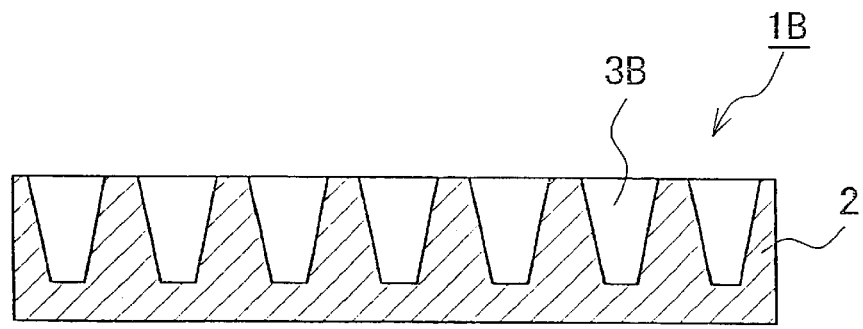
FIG. 5 is a cross-sectional view showing another embodiment of a shock absorbing material according to the present invention.
Figure 6:
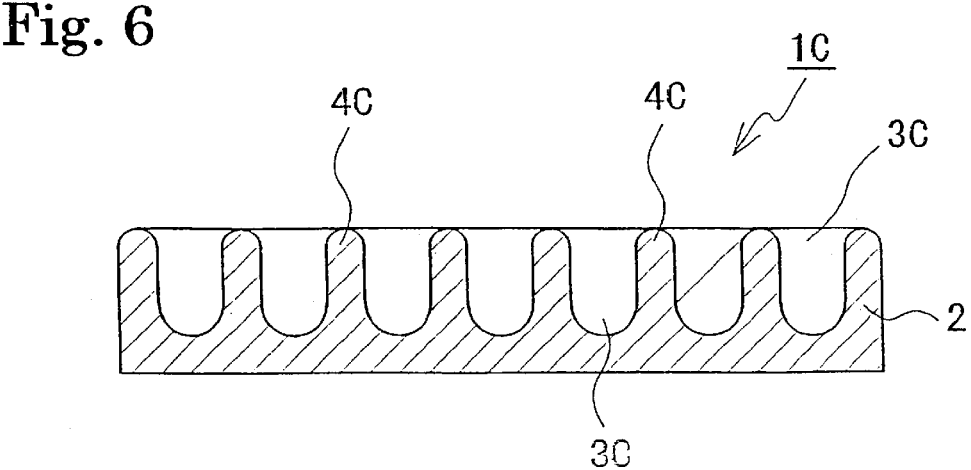
FIG. 6 is a cross-sectional view showing still another embodiment of a shock absorbing material according to the present invention.

Moreover, as to the cross-sectional shape, in addition to one having a rectangular cross-section with the wall parts formed orthogonal to the plane surface of the planar member as shown in FIG. 3, the shock absorbing material 1B can have the concave portions 3B with an inverted trapezoidal cross-section (funnel-shaped) as shown in FIG. 5. Furthermore, the shock absorbing material 1C can have curved edge portions at the upper end part and the bottom portion of the concave portions 3C of the wall parts 4C as shown in FIG. 6.

Furthermore, the concave portions can be disposed in two or more rows, and the arrangement is not limited to a linear one, but can be zigzag, or the like.

With the shock absorbing materials 1B and 1C, adjustment, formability, direction stability, or the like, of the shock absorbing ability can be improved. Moreover, the concave portions can be formed not only in one surface but in both surfaces of the planar member.

Figure 7A:
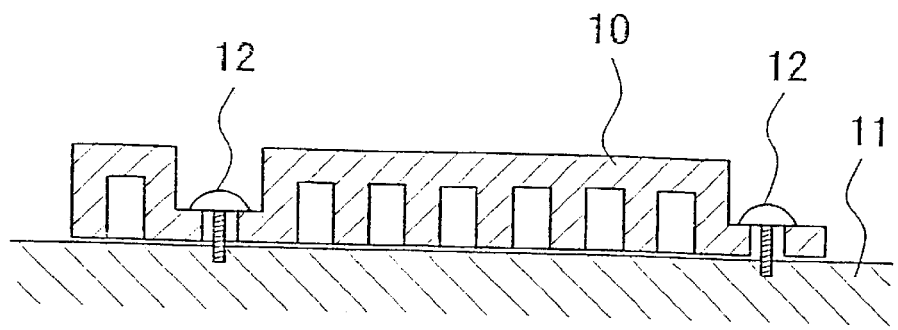
FIGS. 7A, 7B are cross-sectional views showing an embodiment of a method for mounting a shock absorbing material according to the present invention.
Figure 7B:
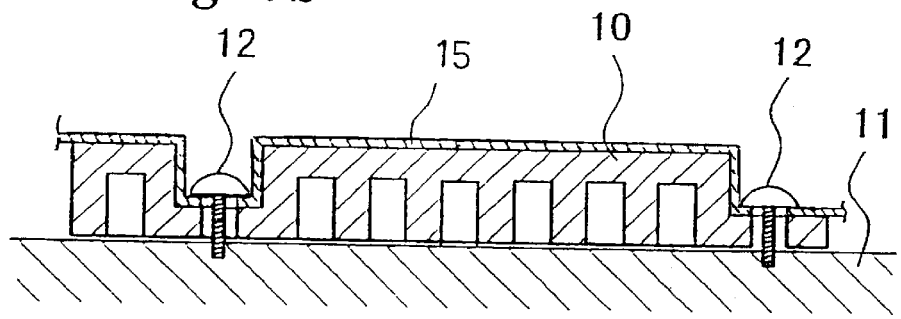
Figure 8:
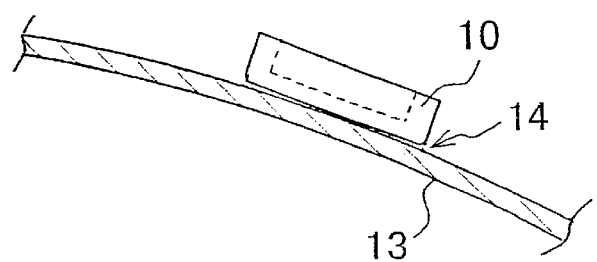
FIG. 8 is a cross-sectional view showing another embodiment of a method for mounting a shock absorbing material according to the present invention.

In order to mount a shock absorbing material of the present invention to a car body, for example, the shock absorbing material 10 of the present invention can be fixed mechanically with a vise, or the like, to a steel plate 11, or the like, of the car body as shown in FIG. 7A. Alternatively, as shown in FIG. 8, the shock absorbing material 10 of the present invention can be attached to an interior part 13 of the car body (for example, a sheet of a ceiling part, or the like) with an adhesive 14 or an adhesive tape. Moreover, in mounting to a side rail, or the like, in order to stabilize the impact characteristics, or the like, the surface can be pressed with a surface material 15 of a steel plate, a resin plate, or the like, as shown in FIG. 7B. Alternatively, the surface material 15 can be mounted by adhering or bonding with the shock absorbing material 10. By attaching the surface material 15 accordingly, the shock absorbing material 10 can be mounted easily to the car body and the mounting strength can be improved.

In mounting a shock absorbing material to a car body accordingly, the concave portion of the shock absorbing material can be disposed either at the inner side or the outer side of the interior of a car. The arrangement direction can be determined optionally according to mounting stability, shock absorbing ability stability, or the like.

Hereinafter, the shock absorbing material according to the present invention will be explained more specifically with reference to examples and comparative examples.

In the following examples and comparative examples, the shock absorbing ability as a head protecting material was measured by the shock applied on a dummy in an acceleration in a dynamic evaluation test using the dummy, and the extent of the head injury criteria (HIC (d)) calculated from the acceleration were evaluated. In general, an HIC (d) of 1,000 or less is evaluated to be excellent in terms of shock absorbing ability. Automobile manufacturers develop products to have a value of 800 or less to ensure safety.

EXAMPLE 1

A shock absorbing material with the shape shown in FIGS. 1 and 3 was produced from a rigid polyurethane foam having a compression stress of 15 kg/cm$^2$. The shock absorbing material comprises a planar member having an external size of 210 mm (in the longitudinal direction)×60 mm (in the lateral direction)×20 mm (in the vertical direction), with concave portions of 50 mm×10 mm×10 mm (depth) provided parallel with an arrangement pitch of 15 mm with a 5 mm thickness T of the wall parts, and a 28% excavation ratio.

The head injury criteria were measured for the shock absorbing material. Results are shown in Table 1.

COMPARATIVE EXAMPLE 1

Figure 9:
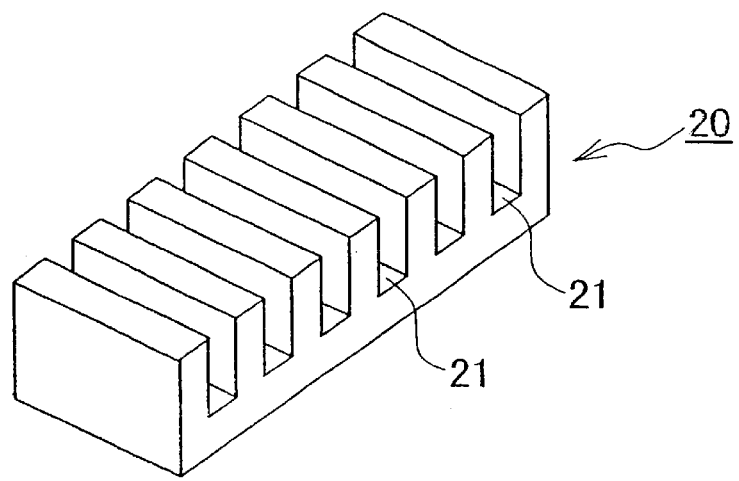
FIG. 9 is a perspective view of a shock absorbing material according to a comparative embodiment.

The head injury criteria were measured for a shock absorbing material 20 with groove parts 21 arranged parallel as shown in FIG. 9. Results are shown in Table 1. The material comprising the shock absorbing material 20 is the same rigid polyurethane foam used in Example 1. The external size thereof is the same as that of Example 1. The excavation ratio (the volume ratio of the groove parts with respect to the volume of the groove parts and the rigid polyurethane foam part) is 33%.

COMPARATIVE EXAMPLE 2

Figure 10:
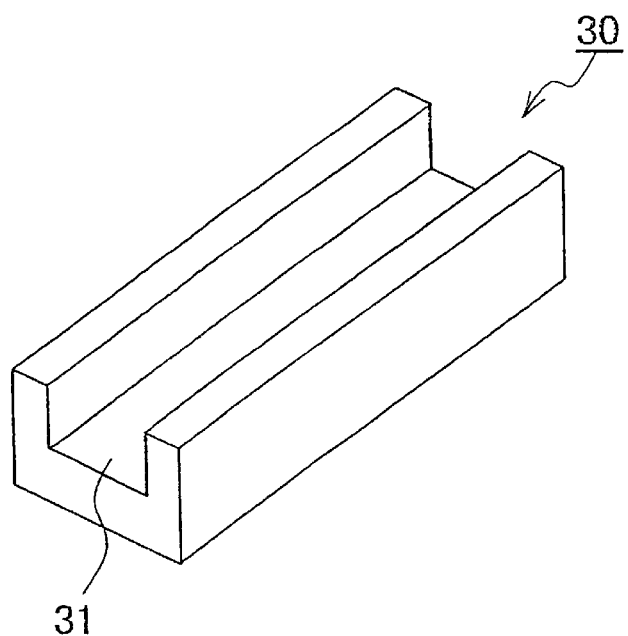
FIG. 10 is a perspective view of a shock absorbing material according to a comparative embodiment.

The head injury criteria were measured for a shock absorbing material 30 with a groove part 31 formed in the longitudinal direction as shown in FIG. 10. Results are shown in Table 1. The material comprising the shock absorbing material 30 is the same rigid polyurethane foam used in Example 1. The external size thereof is the same as that of Example 1. The excavation ratio (the volume ratio of the groove parts with respect to the volume of the groove parts and the rigid polyurethane foam part) is 33%.

COMPARATIVE EXAMPLE 3

A shock absorbing material was produced in the same manner as in Example 1, except that a rigid polyurethane foam having a compression stress of 2.8 kg/cm$^2$ was used, and the head injury criteria were measured. Results are shown in Table 1.

TABLE 1

| Example | Compression stress of the rigid polyurethane foam (kg/cm$^2$) | Evcavation ratio (%) | Head injury criteria HIC(d) |
|---|---|---|---|
| Example 1 | 15 | 28 | 770 |
| Comparative Example 1 | | 33 | 1100 |
| Comparative Example 2 | | 33 | 1300 |

TABLE 1-continued

| Example | Compression stress of the rigid polyurethane foam (kg/cm$^2$) | Evcavation ratio (%) | Head injury criteria HIC(d) |
|---|---|---|---|
| Comparative Example 3 | 2.8 | 28 | 2100 |

EXAMPLE 2

A shock absorbing material was produced in the same manner as Example 1 except that the concave portions were formed so as to have the width of the wall part and the excavation ratio of the values shown in Table 2, and the head injury criteria were measured. Results are shown in Table 2.

TABLE 2

| No. | Draft ratio | Width of the wall part (mm) | Head injury criteria HIC(d) |
|---|---|---|---|
| 1 | 6 | 15 | 1200 |
| 2 | 11 | 10 | 1100 |
| 3 | 19 | 15 | 1000 |
| 4 | 28 | 5 | 770 |
| 5 | 31 | 5 | 940 |
| 6 | 43 | 5 | 1250 |
| 7 | 52 | 5 | 1900 |

COMPARATIVE EXAMPLE 4

A shock absorbing material was produced in the same manner as in Example 1 except that the arrangement pitch of the concave portions was 35 mm, with the concave portion size changed so as to have the same excavation ratio. According to the evaluation of the shock absorbing material, the head injury criteria can be 1,000 or less depending on the impact position, but the value fluctuates depending on the impact position, and thus it is disadvantageous due to slight inferiority of performance stability and reliability.

As is apparent from the Examples and the Comparative Examples heretofore explained in detail, according to the shock absorbing material of the present invention, a shock absorbing material for automobiles, having extremely good shock absorbing ability, capable of absorbing shock energy applied to the heads of passengers in a car interior at the time of a crash, or the like, and reducing the head injury criteria can be provided.

FIG. 11 is a cross-sectional view showing an embodiment of a method for mounting a protecting material according to the present invention. FIGS. 12A to 12D are plan views showing embodiments of attaching an adhesive tape.

As shown in FIG. 11, in the present invention, an adhesive sheet (in FIG. 1, adhesive tape) 3 comprising a base material 3A made of a foam material with an adhesive layer 3B formed thereon is used for mounting a head protecting material 1 onto a ceiling material 2, or the like. The present invention can be adopted for mounting the head protecting material not only to the ceiling material but also to any of the other interior materials and to the car body.

As the foam material comprising the base material of the adhesive sheet to be used in the present invention, various foam materials, such as polyolefin resin foams including soft polyurethane foam, polypropylene, polyethylene, or the like, a foam rubber, or the like may be mentioned. As to the density thereof, it is desirably in the range of 0.005 to 0.5 g/cm$^3$, in particular, 0.005 to 0.2 g/cm$^3$. That is, since a foam material with a high density of more than 0.5 g/cm$^3$ cannot conform to deformation due to the hardness thereof, the falling off preventing effect of the head protecting material cannot be sufficiently obtained. On the other hand, a low density foam material with a density less than 0.005 g/cm$^3$ can be easily ruptured or damaged by handling since the strength of the foam material is low, and thus it is not practical.

Moreover, the thickness of the base material comprising the foam material is preferably in the range of 0.5 to 5 mm. That is, a thin base material with a thickness of less than 0.5 mm cannot sufficiently yield the effects of preventing the falling off caused by the base material deformation of the head protecting material. Furthermore, since the clearance of the parts is set to about 5 mm or less in an ordinary car body, with a base substrate having a thickness of more than 5 mm, the adhesive sheet portion is thicker than the clearance so that the head protecting material can fall off by contact with the car body during assembling with the car body, or the head protecting material contacts with other parts, generating strange noises, and thus it is not preferable. Moreover, in the case of a base material having a thickness of more than 5 mm, when a shock is applied to the head protecting material mounted with the adhesive sheet, the base material of the adhesive sheet can be substantially deformed depending on the direction of the shock so as to generate displacement of the head protecting material, and thus the initial load necessary for protecting the head from shock cannot be obtained, and the head protecting material cannot perform the function thereof. In general, since shocks may be applied from various directions to the head protecting material, it is extremely important to ensure prevention of such displacement in order to protect the head.

As to the adhesive material of the adhesive layer to be formed on the base material, an ordinary adhesive material, such as acrylic, rubber, of the like, can be used. In general, the adhesive layer is formed with such an adhesive material at a thickness of about 0.01 to 1 mm.

In mounting the head protecting material to a ceiling material, or the like, with such an adhesive sheet, the method for attaching the adhesive sheet is not particularly limited, but a band-like adhesive tape 3 can be attached in the longitudinal direction of the head protecting material 1 as shown in FIG. 12A, or an adhesive tape 3 cut in a short length can be attached at a plurality of points on the head protecting material 1, as shown in FIGS. 12B and 12C. Moreover, as shown in FIG. 12D, an adhesive tape 3 can be attached according to the shape of the head protecting material 1 with an irregular shape.

In the present invention, a band-like adhesive tape can be used accordingly as the adhesive sheet, or a small sticker-like adhesive sheet of a quadrilateral shape, circular shape, or the like, can be used. It can be selected and used optionally according to the shape, size, the shape of the part to be mounted, or the like, of the head protecting material.

Hereinafter, a method for mounting a protecting material according to the present invention will be explained more specifically with reference to an example.

EXAMPLE 3

Figure 13A:
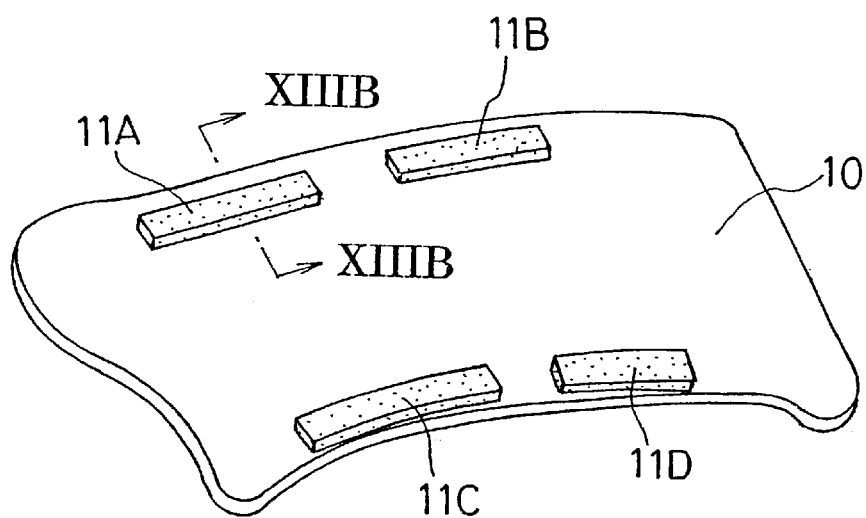
FIG. 13A is a perspective view showing an embodiment of mounting a head protecting material to a ceiling material.
Figure 13B:
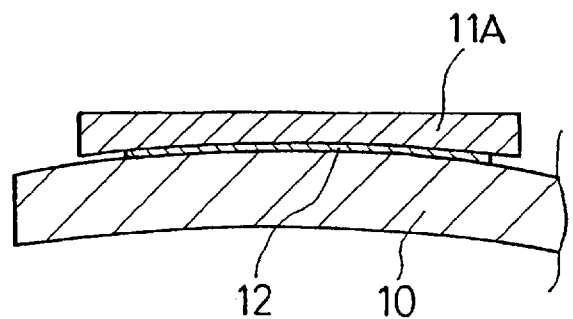
FIG. 13B is an enlarged cross-sectional view taken on the line XIIIB—XIIIB of FIG. 13A.

Ahead protecting material made of a rigid polyurethane foam 60 mm×450 mm×20 mm with an adhesive tape comprising a base material having a thickness of 3 mm made of a soft polyurethane foam with a 0.02 g/cm$^3$ density having an acrylic adhesive material adhesive layer (thickness: 0.06 mm) formed on both sides thereof, attached as shown in FIG. 12A, was mounted to a ceiling material for automobiles at the position shown in FIG. 13A. After mounting the head protecting material, the ceiling material was transported and assembled into a car body.

When a head protecting material was mounted with an adhesive tape comprising a base material such as non-woven fabric, paper, plastic film, or the like, with an adhesive material applied thereon for forming an adhesive layer, falling off of the head protecting material occurred at the time of transportation and assembly. However, in this embodiment, even when the ceiling material was deformed during transportation or impact with another part at the time of assembly, the head protecting material was adhered firmly without peeling off or falling off.

As is apparent from the above-mentioned Example 3, according to the present invention, in mounting a protecting material such as a head protecting material using an adhesive tape, capable of being easily and inexpensively mounted, with superior mounting operability, without the need for fixing time or holding time, deformation of the part mounted with the protecting material during handling, or peeling off or falling off of the protecting material at the time of impact by another part can be prevented. Therefore, according to the present invention, a protecting material can be mounted easily, securely, and firmly to a part, which can be drastically deformed or have shock applied thereto, such as a ceiling material, a trim, a car body, or the like, of an automobile.

What is claimed is:

1. A method for mounting a protecting material comprising:

mounting a material for protection by an adhesive sheet to a required portion, said material for protection comprising a rigid polyurethane foam having a compression stress of at least 3 kg/cm$^2$, said material for protection having a shape of a board, concavities arranged on at least one surface thereof, and walls for dividing the concavities so that when a predetermined shock corresponding to the compression stress of at least 3 kg/cm$^2$ is applied to the material for protection, at least one of the walls is crushed and destroyed, and enters at least one of the concavities adjacent thereto to thereby absorb the shock, wherein the adhesive sheet comprises a base foam material and an adhesive layer formed thereon.

2. The method for mounting a protecting material according to claim 1, wherein a density of the foam material is 0.005 to 0.5 g/cm$^3$, and a thickness of the base foam material is 0.5 to 5 mm.

3. The method for mounting a protecting material according to claim 1, wherein the protecting material is for protecting a head of a passenger including a driver.

4. The method for mounting a protecting material according to claim 1, wherein the foam material is a soft polyurethane foam, a polyolefin resin foam, or a foam rubber.

5. The method for mounting a protecting material according to claim 1, wherein said adhesive layer is formed of an acrylic adhesive material or a rubber adhesive material.

6. The method for mounting a protecting material according to claim 1, wherein a density of the foam material is 0.005 to 0.2 g/cm$^3$.

7. The method for mounting a protecting material according to claim 1, wherein a thickness of the adhesive layer is 0.01 to 1 mm.

* * * * *